United States Patent

Proni et al.

(10) Patent No.: US 6,726,352 B2
(45) Date of Patent: Apr. 27, 2004

(54) PROCESSING METHOD OF A MIXTURE FOR TIRE RUBBER COMPOUND

(75) Inventors: Antonio Proni, Lodi (IT); Gianluigi Hotellier, Milan (IT); Daniele Balasso, Calusco D'Adda (IT)

(73) Assignee: Pirelli Pneumatici SpA, Milan (IT)

(*) Notice: Subject to any disclaimer, the term of this patent is extended or adjusted under 35 U.S.C. 154(b) by 0 days.

(21) Appl. No.: 10/009,586

(22) PCT Filed: Apr. 10, 2001

(86) PCT No.: PCT/EP01/04130
§ 371 (c)(1),
(2), (4) Date: Apr. 17, 2002

(87) PCT Pub. No.: WO01/78956
PCT Pub. Date: Oct. 25, 2001

(65) Prior Publication Data
US 2002/0193465 A1 Dec. 19, 2002

Related U.S. Application Data

(60) Provisional application No. 60/231,698, filed on Sep. 11, 2000.

(30) Foreign Application Priority Data

Apr. 14, 2000 (IT) ...................................... MI2000A0841

(51) Int. Cl.$^7$ .................................................. C08J 3/00
(52) U.S. Cl. ........................... 366/69; 366/91; 700/196; 523/303
(58) Field of Search .......................... 523/303; 700/196, 700/239; 366/69, 83–85, 76.7, 91; 264/211.23, 40.7

(56) References Cited

U.S. PATENT DOCUMENTS

| | | |
|---|---|---|
| 3,999,046 A | 12/1976 | Porter |
| 4,455,091 A | 6/1984 | Bamberger et al. |
| 5,865,535 A | 2/1999 | Edwards |

FOREIGN PATENT DOCUMENTS

| | | |
|---|---|---|
| EP | 0 520 812 | 12/1992 |
| GB | 1 535 545 | 12/1978 |
| WO | WO 00/59699 | 10/2000 |

*Primary Examiner*—Terry K. Cecil
(74) *Attorney, Agent, or Firm*—Finnegan, Henderson, Farabow, Garrett and Dunner, L.L.P.

(57) ABSTRACT

A method for processing a rubber mixture or compound for tire manufacturing includes the steps of determining variation tolerances with respect to reference values for process parameters, detecting values of the process parameters, comparing detected values of the process parameters with the reference values and the variation tolerances, attributing an evaluation to a semi-finished product depending on compliance or noncompliance of the detected values with the reference values and the variation tolerances, classifying the semi-finished product on a basis of the attributed evaluation, and establishing successive steps for processing the semi-finished product depending on the classification of the semi-finished product. The processing includes at least a mixing cycle and an extrusion cycle for obtaining the semi-finished product. The cycles are controlled by the process parameters detected during execution of the cycles.

14 Claims, 6 Drawing Sheets

| PROCESS PARAMETERS | EXPECTED PROCESS PARAMETERS AND ASSOCIATED TOLERANCES | | | | NON-COMPLIANT WEIGHING | EXAMPLE OF CHECK FOR COMPLIANCY OF PROCESS PARAMETER VALUES OF A BATCH WITH PREDETERMINED LIMIT VALUES | | | BASIS: TOTAL SCORE |
|---|---|---|---|---|---|---|---|---|---|
| | MIXTURE | | | | | MIXTURE | | | |
| | STEP NO. | Set value | Tol.- | Tol.+ | WEIGHT | STEP NO. | ACTUAL VALUE | WITHIN LIMITS? | SCORE | |
| STEP TIME (sec) | H-I | 30 | 0 | 6 | 5 | H-I | 46 sec | NO | 5 | 0-2: NORMAL |
| PARTIAL TEMPERATURE (°C) | I | 120 | 0 | 5 | 5 | I | 120°C | YES | 0 | |
| PARTIAL ENERGY (KWH) | I | 17.5 | 1.5 | 1.5 | 5 | I | 19.7 KWH | NO | 5 | 21-30: DEFECTIVE 1st DEGREE |
| STEP TIME (sec) | L-M | 25 | 5 | 5 | 7 | L-M | 42 sec | NO | 7 | |
| PARTIAL TEMPERATURE (°C) | M | 145 | 0 | 0 | 0 | M | 145°C | YES | 0 | 31-60: DEFECTIVE 2nd DEGREE |
| PARTIAL ENERGY (KWH) | M | 24.5 | 2.4 | 2.4 | 8 | M | 27.7 KWH | NO | 8 | |
| PARTIAL CYCLE TIME (sec) | N | 315 | 45 | 125 | 10 | N | 470 | NO | 10 | >60: REJECT |
| TOTAL MIXING TIME (sec) | N | 245 | 25 | 120 | 40 | N | 305 | YES | 0 | |
| TOTAL ENERGY (KWH) | N | 27.0 | 1.0 | 4.0 | 10 | N | 32.1 | NO | 10 | |
| PARTIAL TEMPERATURE (°C) | N | 145 | 4 | 4 | 10 | N | 144 | YES | 0 | |
| | | | | | 100 | | | | 45 | DEFECTIVE 2nd DEGREE |

Fig.4

| PROCESS PARAMETERS | DETECTED VALUE |
|---|---|
| MAINTENANCE TIME OF MIXTURE INSIDE THE EXTRUDER | 11 min |

▲ REJECT

| | REFERENCE CLASSIFICATION |
|---|---|
| </= 6 min | NORMAL |
| > 6 min / 9 min | DEFECTIVE 2$^{nd}$ DEGREE |
| > 9 min | REJECT |

FIG. 5

PROCESSING METHOD OF A MIXTURE FOR TIRE RUBBER COMPOUND

CROSS-REFERENCE TO RELATED APPLICATIONS

This application is a national stage entry under 35 U.S.C. §371 from International Application No. PCT/EP01/04130, filed Apr. 10, 2001, in the European Patent Office; additionally, Applicants claim the right of priority under 35 U.S.C. §119(a)–(d) based on patent application No. MI2000A000841, filed Apr. 14, 2000, in the Italian Patent Office; further, Applicants claim the benefit under 35 U.S.C. §119(e) based on prior-filed, copending provisional application No. 60/231,698, filed Sep. 11, 2000, in the U.S. Patent and Trademark Office; the contents of all of which are relied upon and incorporated herein by reference.

BACKGROUND OF THE INVENTION

1. Field of the Invention

The present invention relates to a method for processing mixtures and compounds made from rubber and various ingredients, used to obtain tires and components thereof such as tread bands and the like: the invention is especially advantageous when used in connection with the production of rubber compounds reinforced with silica.

More particularly, the compounds which may be prepared with the method according to said invention are those of the type comprising a polymeric base having an unsaturated chain that can be crosslinked with sulphur in hot conditions, added to at least one silica filler and a silica bonding agent containing at least one sulphur atom.

The polymeric base may be any polymer or mixture of polymers, non-crosslinked, of natural or synthetic type, able to assume all the chemical/physical and mechanical features of elastomers after suitable crosslinking.

2. Description of the Related Art

European patent application No. 99.830189.9, in the name of the Applicant of the present invention, discloses a method for producing the abovementioned compounds including at least a first operating step intended for mixing the various basic ingredients so as to obtain a mixture.

This step is performed in a closed discontinuous mixer, i.e. a known device which basically comprises a container internally housing a pair of rotors turning in opposite directions, so as to mix up the ingredients introduced into the container from the top thereof.

For this purpose, said device is provided with a pneumatic cylinder located in the upper part of the container and a piston movable upwards to open the container, thereby allowing the introduction of the ingredients via special loading hoppers, and downwards so as to exert a pressure on the material processed by the rotors and located above them.

A pneumatic system located on the bottom of the container allows discharging of the mixture at the end of the mixing cycle by opening a suitable outlet.

As mentioned above, the devices likes the one described above are well known in the art: they are indeed referred to as "Banbury®" or "Intermix®", depending on whether the rotors operate tangentially relative to each other or are inter-penetrating.

Hereinbelow the material processed during the various operating steps will be indicated by the term "mixture" in order to distinguish it from the "compound", which is instead the product obtained by adding the vulcanizing system to the mixture.

The method claimed in the abovementioned patent application is aimed at providing substantially constant characteristics for those compounds having identical composition, but being produced discontinuously in separate batches, namely with the new charging of basic ingredients into the mixer after it has been emptied of the previous contents.

Indeed, not infrequently it happens that in the known processing methods, the final compounds produced from successive batches have physical and mechanical properties which are also significantly different from each other, despite being produced from the same basic ingredients and using the same recipes.

For this purpose, in the prior method there are defined at least two indirect process parameters, for example the power applied to the pair of opposing rotors and the temperature of the mixture processed by them, together with at least two direct parameters such as the speed of the rotors and the pressure exerted by the piston of the discontinuous mixer.

Thereafter, in order to obtain the desired result, the method according to the aforementioned application suggests to periodically detect one or both of the indirect parameters and, if necessary, to correct their progression over time, by varying one or both of the direct parameters.

This operating method allows to achieve the object of producing in a repeatable manner, compounds with constant characteristics or in any case that fall within a predefined range of variation.

However, this method relates only to the operating steps which occur within the discontinuous mixer and does not analyse the manufacturing process of the mixtures as a whole; in other words, the method described in European patent application No. 99.830189.9 does not analyse the consequences brought by the non-compliance with the predefined limit values for the (direct and indirect) mixing process parameters, on the other steps of the mixture and compounds processing cycle (for example on additional steps involving mixing with other mixtures in order to obtain the so-called "blends", on vulcanization, etc.).

For instance, reference should be made to the case where malfunctioning of a machine or human error could result in the temperature of the mixture or the power used by the rotors at a given instant, deviating from the predefined values: what are the consequences and what steps may be taken in order to remedy this situation?

It should be noted that the answer to said questions is of considerable importance because, as will be seen, it avoids the production of large quantities of material which must then be discarded at the end of the manufacturing process, together with all the negative consequences arising therefrom.

SUMMARY OF THE INVENTION

The object of the present invention is therefore to solve this problem by providing a method for processing mixtures and rubber compounds, whereby it is possible to operate immediately on line in order to correct or limit the negative consequences arising from fluctuations of the process parameters, beyond the predefined tolerance limits.

The invention comes from Applicant's perception that the operating steps which make up the cycle for processing of the mixtures and compounds are of varying importance for obtaining the desired features in the end product.

Consequently, in accordance with the present invention, a processing method has been developed whereby at first reference values with associated deviation tolerances for the process parameters, during one or more operating steps, are defined.

These parameters may be the energy used by the rotors, the temperature of the mixture and the duration of mixing within the mixer or, downstream of the latter, the duration of the cycle for extraction of the semi-finished product in sheet form (hereafter also referred to in short as "extrusion"), as well as any other parameter according to the circumstances.

Thereafter, coefficients indicating the weight (or importance) of compliance with the tolerances, in order to achieve the desired final characteristics in a given compound, are assigned.

Throughout the manufacturing process, the aforementioned process parameters are measured for each batch and respective evaluation coefficients are attributed, depending on the values measured; finally, the coefficients attributed are added together and, on the basis of the result obtained, a classification of the semi-finished products obtained with the various batches of material is determined.

This classification provides a qualitative evaluation of the semi-finished product and, on the basis thereof, it becomes possible to operate directly along the production line in order to prevent any defective mixtures or compounds from causing damage to subsequent production.

For instance it could be considered the case where a mixture to be discarded is mixed together with other defect-free mixtures, thereby adversely affecting the "blend" obtained: this might require to discard large quantities of the material produced.

In particular, the method according to the invention is specifically used for the production of silica-reinforced compounds which comprise the following ingredients in variable quantities, per hundred parts by weight of polymeric base (phr), between the following limits:

| Polymeric base | 100 |
| Carbon black | 0–80 |
| Silica | 10–80 |
| Silica bonding agent | 4%–15% of silica |
| Zinc oxide (ZnO) | 1–3 |
| Stearic acid | 0–3 |
| Anti–degradation agents | 1–3 |
| Plasticizing oil | 0–30 |
| Anti–ozone wax | 0.5–3 |
| Specific chemical ingredients | 0–15 |

In accordance with this aspect of the invention, the tolerance ranges of the process parameters are predefined for each type of compound to be produced.

BRIEF DESCRIPTION OF THE DRAWINGS

Further characterising features of the present invention and the advantages deriving therefrom will appear more clearly from the description provided herein below, relating to a preferred and a non-exclusive embodiment thereof illustrated in the accompanying drawings wherein.

DETAILED DESCRIPTION OF THE PREFERRED EMBODIMENTS

Figure 1:
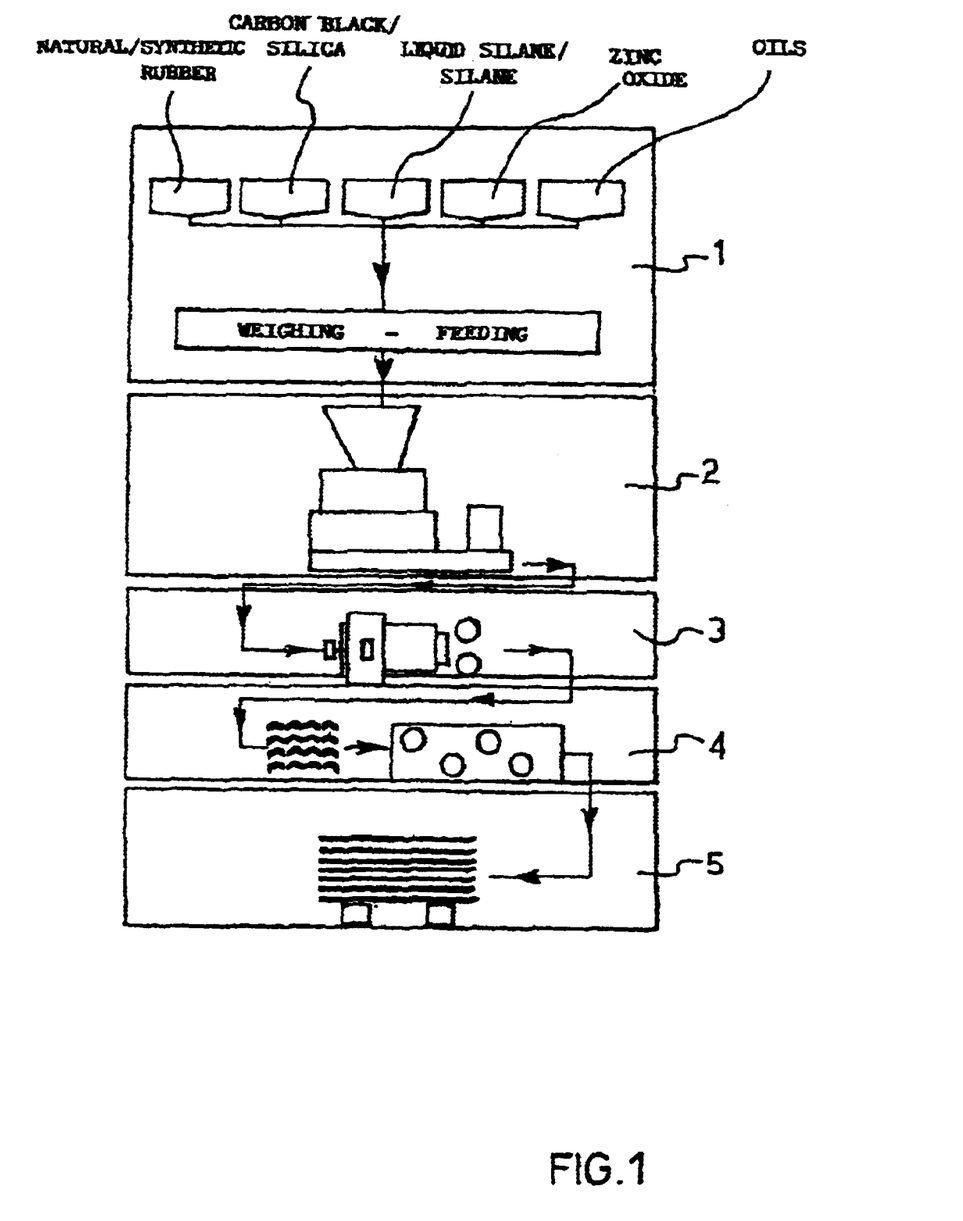
FIG. 1 illustrates in a diagramatic form the typical processing steps of a mixture using the method according to the present invention.

With reference to the figures listed above, the first of them shows in schematic form the main steps which make up the processing cycle for the preparation of a mixture starting from basic ingredients; the general features of these steps are already known since they are normally used for the production of tyre compounds.

The first of said steps, indicated by 1, consists in weighing the various ingredients and feeding them to a discontinuous mixer which will be better described below.

Said mixer, during step 2, performs mixing of the various ingredients in accordance with predetermined process parameters and the mixture thus obtained is conveyed to an extruder where step 3 is performed.

The extruder may be of the double-screw or single-screw type; in both cases, at the extruder outlet, the mixture is rolled by using a pair of calendering rolls (visible sidewise in step 3 of FIG. 1) so as to form it into sheets of predefined width (60–80 cm) and thickness (6–10 mm).

In accordance with a preferred embodiment of the invention, the calendering rolls are of the variable friction type so that it is possible to vary their torque and operating speed.

As an alternative to the extruder system plus calendering rolls, for performing the mixture into sheet it is also possible to use mixers of the open type, where the mixture is poured from above with respect to a pair of counter-rotating drums which roll it, and then wound it onto one of them.

The sheets obtained then undergo a "batch-off" treatment (step 4) wherein they are wetted with a liquid solution which reduces their surface adhesion; following this step they are cooled and dried, being hung up in festoons within special ventilated chambers.

The sheets thus treated are then arranged on benches, waiting for further processing thereof (step 5).

More specifically, in accordance with the method of the invention the strip-like sheets are sorted out onto various benches, depending on the degree to which the predefined process parameters have been complied with during the process; the manner in which this selection is performed will be described in greater detail below.

It must be pointed out here, however, that as a result of sorting the sheets on the various benches following to the quality degree of the product, respective uses may be envisaged for the various selected sheets to prevent those which are defective or in any case do not perfectly satisfy the necessary requirements, from being subsequently mixed with sheets which are defect-free.

Consequently, the sheets of one bench may undergo processing operations different from those of another bench; for example some sheets (those regarded as satisfying the necessary requirements) will be further processed in a discontinuous mixer together with the vulcanizing agent so as to form the final raw compound, other sheets (considered to be defective) will be combined with further mixtures so as to obtain a desired blend, whereas finally other sheets (considered to be unacceptable) will be discarded.

The further processing operations may be performed with the same means used for steps 2–5 or also in different installations.

Figure 4:
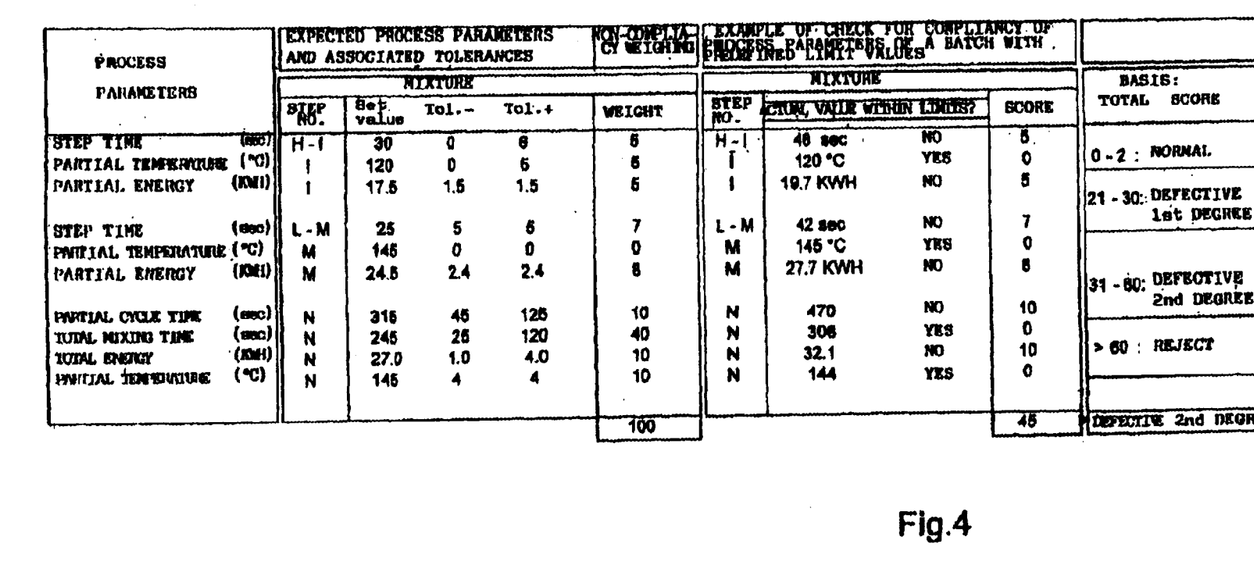
FIGS. 4 and 5 show respective tables for evaluation of semi-finished products obtained with the method according to the invention.
Figure 5:
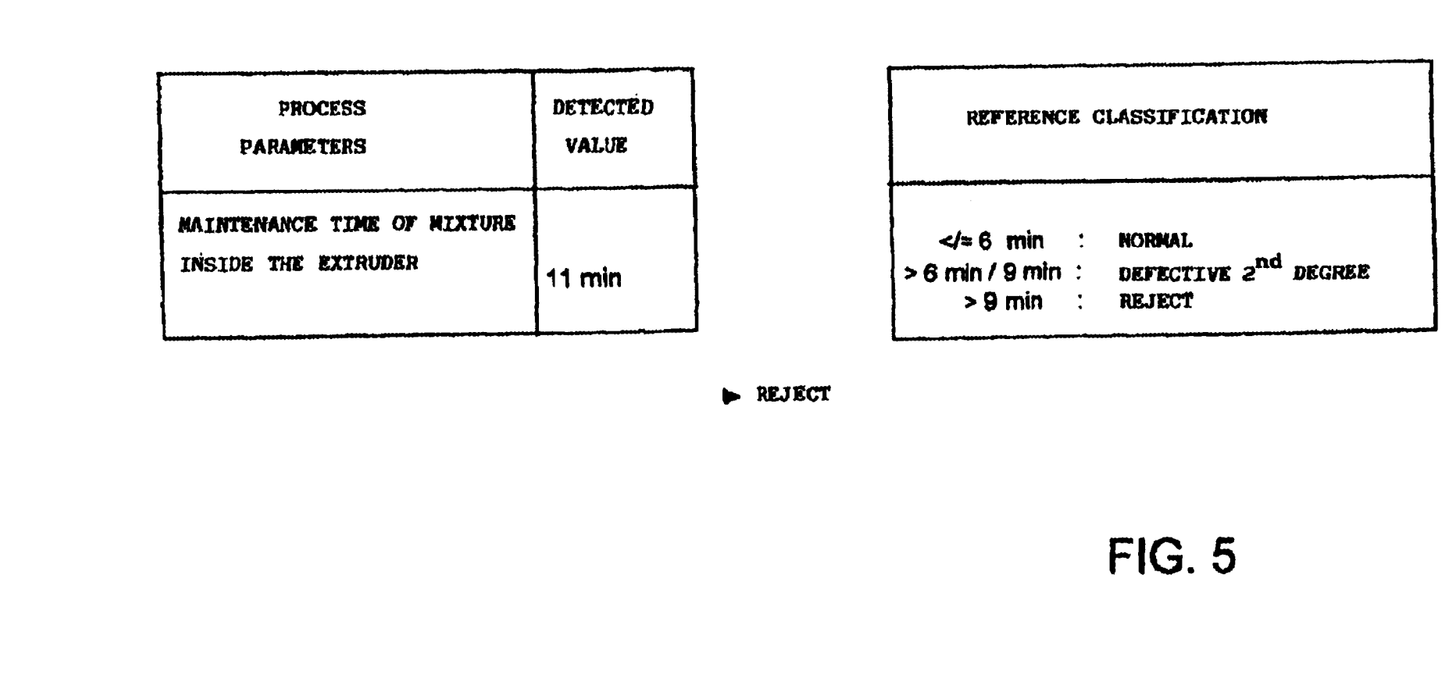

The tables of FIGS. 4 and 5 show some values indicating the tolerances with respect to nominal reference values, applicable to certain process parameters being respectively monitored during the corresponding steps H–N; these nominal values and the associated tolerances may be obtained in an experimental manner and obviously depend on the type of mixture being processed.

These values therefore depend on the composition of the mixture and on the features thereof to be obtained during the various processing steps.

Figure 2:
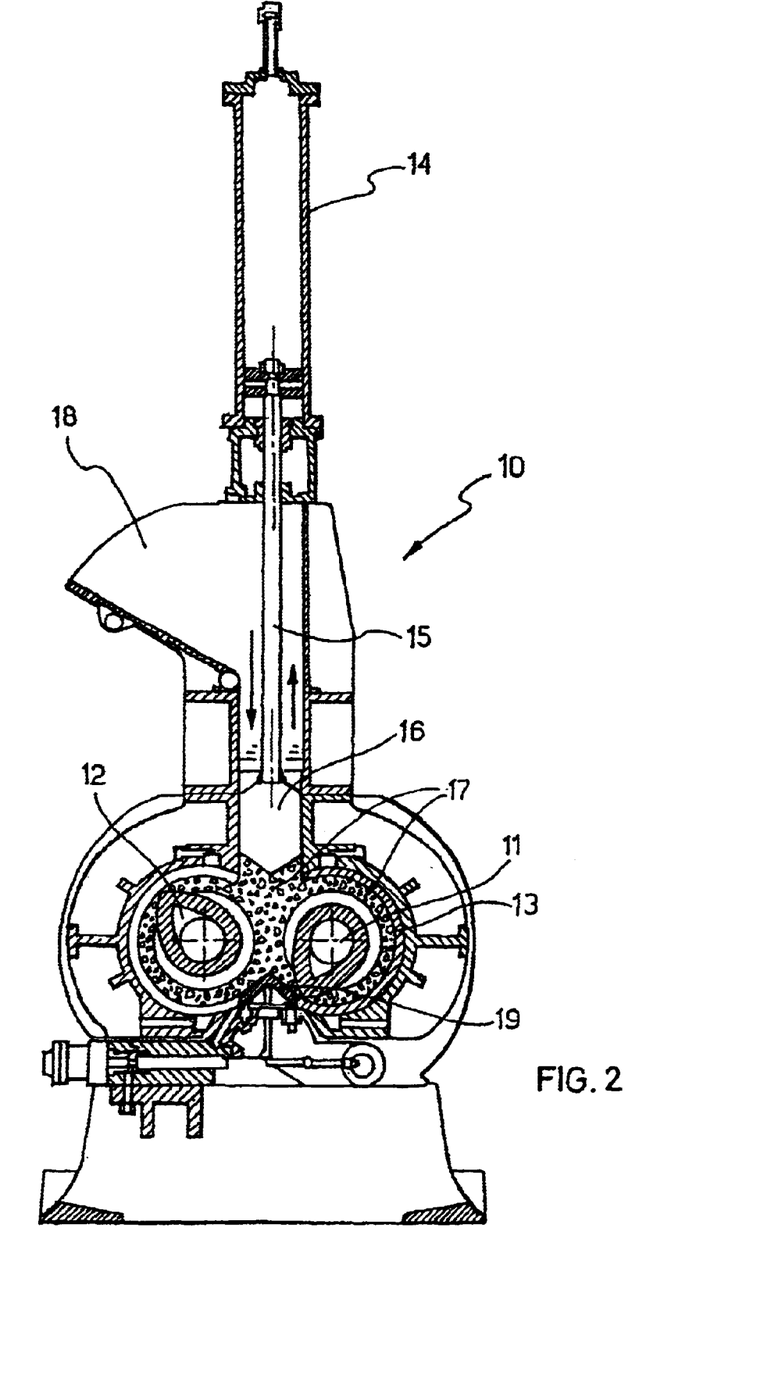
FIG. 2 shows in simplified form a discontinuous mixer used in the method according to the invention.
Figure 3:
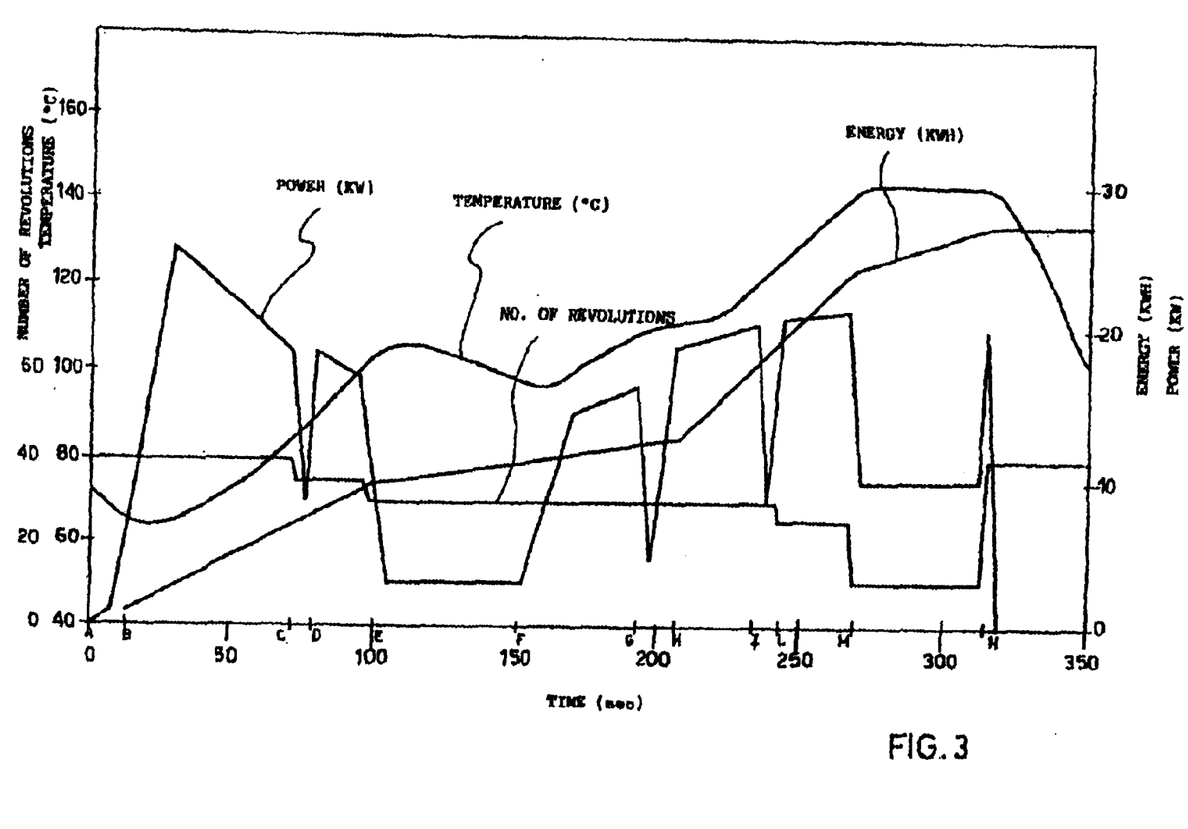
FIG. 3 shows, in the form of a Cartesian diagram, the variations over time of the main process parameters during working in the mixer of FIG. 2.

For example, with a discontinuous mixer 10 such as that shown in FIG. 2 (Banbury® type), provided with a pair of tangential rotors 11 and 12 which have an interrupted-spiral profile and which rotate in opposite directions inside a chamber 13, and a pneumatic (or hydraulic) cylinder 14 which operates a piston 16 by means of a rod 15 so as to compress the mixture 17, it is possible to perform a mixing operation such as that shown in FIG. 3.

In this mixer, indeed, the pressure exerted by the piston 16 on the mixture 17 may be varied by raising or lowering said piston: this consequently also allows variation of the power needed to provide rotation of the rotors 11, 12 and therefore the energy used by the system; the energy appears as an increase or decrease in the temperature of the mixture.

In order to carry out the method of the invention, the indirect process parameters such as the energy used by the pair of rotors 11, 12, are monitored during processing in a predetermined time sequence; generally, the time interval between two successive monitoring operations is lower than two minutes, preferably not greater than 30 seconds and, even more preferably, not greater than 15 seconds so as to be able to correct in real time any oscillation within the predefined tolerance intervals.

Where considered necessary or appropriate, these indirect process parameters are monitored at even shorter intervals, lower than one second, during the different processing stages mentioned above so as to minimize the degree of deviation of the values of said parameters from the predefined nominal value.

At the start of the working cycle, the piston 16 is fully raised so as to allow the introduction, through a side hopper 18 of the mixer, of a charge of material comprising at least one polymer or a mix of polymers, a reinforcing filler comprising silica in combination with, or instead of, carbon black and a bonding agent for the white filler.

In this connection it must be pointed out that in the present description "white reinforcing fillers" are meant those ingredients of inorganic type, such as gypsum, talc, kaolin, bentonite, titanium dioxide, alumina and various silicates and silica, used in tyre compounds for example in order to increase the roadholding in wet conditions or reduce the rolling resistance of the tyre.

For the sake of brevity said white fillers have been referred to, and will be referred to, generally by the term "silica" or "silica fillers"; however, this term must nevertheless be understood in the broadest sense of its meaning.

The quantity of material loaded, depending on the volume of the mixer, in this case is preferably between 220 and 250 kg.

As can be noted from the graph of FIG. 3, during loading the curve of the adsorbed mechanical power has a minimum value since the pair of rotors has not yet started mechanical processing of the materials; along this section the curve of the temperature shows a downward trend due to the fact that the thermocouples measure the temperature inside the chamber 13 which is cooling, following the unloading of the previous mixture and the subsequent introduction of new material at the environmental temperature.

The entire quantity of silica may be introduced at the start of the processing cycle or preferably during at least two separate steps of the abovementioned cycle.

When loading of the material has been completed, the piston 16 is lowered so as to compress the material inside the chamber 13; here and in the following of the description the movements of the piston are regarded as being substantially instantaneous.

Following this lowering movement, the adsorbed mechanical power rapidly increases until it reaches a peak value (after 30 seconds) since the rotors 11 and 12, which are kept rotating at constant revolutions, exert the maximum force required to break up and mix together the components of the mixture which still have high viscosity values; also the temperature starts to rise. Subsequently, as mixing proceeds and the temperature increases, the viscosity, and consequently also the power consumption, diminishes.

At point C of the processing cycle the number of revolutions of the rotors undergoes a first reduction (of the order of 10%) and at the same time the piston is raised so that the power adsorbed is reduced to a corresponding minimum value: however, after a few moments the piston is lowered again, thereby giving rise to a new peak value of the adsorbed power (point D along the abscissa), following which the value falls again owing to the gradual reduction in viscosity, also linked to the continuous increase in temperature which reaches a value of about 100° C.

Raising the piston also has the effect to let to fall towards the rotors those batch portions which have not been incorporated in the mixture and have accumulated on the closing surface of the device as dust between the piston body and the container wall. The various percentages of the mixture components are thus brought to their predetermined values, thereby fulfilling an essential precondition for achieving the final properties of the mixture.

As mentioned above, the operation of controlling processing of the mixture by means of the piston allows the temperature progression to be kept, over time, within the desired values necessary for correct formation of the final product.

Indeed, raising of the piston, by reducing the pressure on the material being processed, ensures a graduated increase in the temperature with a predetermined gradient and in any case has the effect of keeping this parameter within acceptable limits, so as not to adversely affect the properties of the mixture being processed.

At the same time the variation in the number of revolutions of the rotors is used to optimize both the mechanical processing and the temperature control.

The overall working time from the start of the cycle until the point E, for compounds containing silica fillers may be between 95 and 115 seconds.

Once this point has been reached, incorporation of the silica filler into the polymeric matrix is considered to be adequate; therefore, further ingredients are introduced into the mixer. Preferably, during this step a residual quantity of silica, equal to about 25% of the overall quantity, is introduced.

The operation is performed by raising the piston and keeping it in this position for the whole of the time required: during this operation the power consumption falls to minimum values (E–F) and also the mixture temperature drops, not only due to elimination of the piston pressure, but also following the introduction of ingredients at room temperature, which ingredients may include in particular liquid ingredients, such as plasticizing oil, which favours this cooling effect.

Once loading has been completed (point F), the piston is lowered again and kept pressed against the mixture causing a renewed increase in the adsorbed power and a corresponding increase in temperature.

The overall working time from the start of the cycle until this increase, in the case of compounds with a silica filler, may be between 150 and 195 seconds.

Subsequently, other (one or more) adjustments of the direct process parameters are performed, that is, variations in the number of revolutions of the rotors (for example two reductions of the value of about 40% each) and/or movements of the pressing piston, with consequent increases in the adsorbed power, in combination with or separately from each other and of predefined duration, in order to complete dispersion and homogenization both of the silica and of the further ingredients just added, within the polymeric matrix.

It is assumed that at the end of this processing phase, beginning with the start of the cycle until the point indicated by M along the abscissa axis in connection with the last lowering movement of the piston, an optimum dispersion of the fillers in the polymeric matrix has been achieved: this phase is referred to as the silicization step.

At the end of this phase, in accordance with the invention the temperature of the mixture has reached its maximum value, of the order of 140° C., along a thermal profile which always remains within a range of predefined values.

Now starts the so-called silanization phase which occupies the whole of the successive period until the end of the cycle and during which the chemical reaction between silane, silica and polymer mainly occurs.

This reaction consists in chemical bonding of the silica to the polymeric matrix by means of the silane.

During this phase the pair of rotors rotate at a low number of revolutions (preferably of the order of about 5 to 10 revs/min.) so as to keep the temperature substantially constant; this is possible since dispersion of silica and other components in the polymeric matrix had already been performed, and it is no longer necessary to perform a high degree of mechanical working of the mixture.

In accordance with the invention, the temperature parameter is kept at a substantially constant value during this phase; this is due to the heat stored during the previous steps and to the action of the piston which corrects only any deviation of the temperature from the predefined mean value, in particular deviations greater than the permitted range of fluctuation with respect to said mean value.

Once silanization has been completed, the mixture is unloaded.

This operation is performed by opening the discharge outlet 19 located at the bottom of the chamber 13 and by increasing the number of revolutions of the pairs of rotors so that it is preferably brought again to the value of the starting of the cycle.

During this step, the adsorbed power immediately registers a new peak value (point N on the abscissa axis) which immediately decreases following discharging of the mixture; the energy used on average during the whole working cycle described, indicated by the corresponding curve in FIG. 3, is in this example of about 0.12 kWh per kg of compound produced.

The mixture extracted from the mixer is at the temperature of about 140° C. and, as mentioned previously, it is extruded in sheet form and cooled to room temperature.

Processing of the material within the closed mixer 10, in particular for the production of silica-reinforced compounds, influences the characteristics of the material (compound) obtained during the subsequent steps.

The acceptability range, within which the process parameters may fluctuate, is fixed taking into account the variability of the physical and mechanical properties suitable for a reference compound in view of its precise intended use.

Hereby with the expression "reference compound" it is meant a compound with such physical and mechanical properties as to determine, when the compound forms part of the end product, the performances required by said product, for example the performances of a tread band.

The characteristics of a "reference compound" comprise those of the mixture at the outlet of the mixer 10, those of the raw compound extracted from a second mixer where the mixture coming out from the first mixer has been mixed with the crosslinking system, and those of the vulcanized compound.

Among the most important characteristics of the mixture extracted from the first mixer there are the viscosity and the percentage of silanization, whereas among those of the raw compound at the outlet of the second mixer there are again the viscosity and the percentage of silanization as well as the rheometric characteristics, while among those of the vulcanized compound the density, the hardness and the static and dynamic moduli.

Let us now assume that the method described above with the aid of FIGS. 3 and 4 is the optimum cycle for defining the method of production of a compound and that it is required to determine the acceptability range of the process parameters.

The method for determining this acceptability range is performed as described below.

Under uniform conditions of the raw materials and under optimum efficiency of the plant and machinery, a significant number of batches, both of the mixture and of the compound, are produced several times using the optimum process.

The characteristics of the produced items are measured and respectively compared with those of the reference compound and mixture obtained using the abovementioned optimum method, as well as with the values of the process parameters used.

Using a calculation method of the statistical type, the limits within which each process parameter may vary in order to obtain product characteristics included within the predefined limits, are determined.

Purely by way of a non-limiting example, the quantitative limits within which there is a variation in the ingredients of the composition of a typical compound that can be produced using the process according to the invention, are indicated hereinbelow.

The quantities of the ingredients are expressed as parts by weight per hundred parts of polymeric material (phr):

| Polymeric base | 100 |
|---|---|
| Carbon black | 0–80 |
| Silica | 10–80 |

-continued

| Bonding agent | 4%–15% of silica |
|---|---|
| Zinc oxide (ZnO) | 1–3 |
| Stearic acid | 0–3 |
| Anti–degradation agents | 1–3 |
| Plasticizing oil | 0–30 |
| Anti–ozone wax | 0.5–3 |
| Specific chemical ingredients | 0–15 |

In addition thereto there will be included the crosslinking system, in quantities known per se depending on the composition of the mixture, usually comprising sulphur (from 0.5 to 2.5 phr) and vulcanization accelerators.

Among the polymeric bases, preference is given to polymers or copolymers with an unsaturated chain obtained by means of polymerization of conjugated dienes and/or aliphatic or aromatic vinyl monomers.

Given the above, by way of example some tables relating to the reference values for a given compound composition and acceptability ranges of the process parameters are provided hereinbelow.

Thus Table 1 shows the values of the characteristics of the raw compound at the outlet of a mixer such as that shown in FIG. 2, while Table 2 shows some characteristics of the vulcanized compound. In both cases the tolerance ranges are defined by the deviation limits from the (central) reference values, indicated with the symbol ±.

The tables relate to processing of a batch of material of 230 kg optimized with respect to the volume of the mixer and the mixture density; the material introduced into the mixer 10 has a composition chosen from those indicated above and in particular formed as specified hereinbelow:

RECIPE

| | (phr) |
|---|---|
| Natural rubber | 8.00 |
| Polybutadiene | 20.00 |
| SBR "in solution" | 72.00 |
| Plasticizing oil | 5.00 |
| Silica | 63 |
| Stearic acid | 2 |
| Zinc oxide | 2.5 |
| Processing aid | 2.00 |
| Silane (50% predispersed) | 10.00 |
| Wax | 1 |
| Amino anti-oxidant (type TMQ) | 1.00 |
| Amino anti-degradation agent (type 6PPD) | 2.00 |
| Sulphur | 1.20 |
| Accelerator: sulphenamide (type CBS) | 2.00 |
| Accelerator: diphenylguanidine (80% active) | 0.80 |

TABLE 1

| Rheometric characteristics | Central value | Deviation tolerances |
|---|---|---|
| $M_L$ (dNm) | 2.20 | ±0.30 |
| $M_H$ (dNm) | 20.50 | ±2.00 |
| $t_{30}$ (min) | 0.82 | ±0.60 |
| $t_{60}$ (min) | 1.74 | ±0.13 |

The rheometric characteristics are measured in his case in accordance with the standards ISO 6502 by using an instrument of the MDR type for 2 minutes at the temperature of 195° C.

The rheometric units $M_L$ and $M_H$ are expressed in dN*m (tenths of a Newton per meter) corresponding to the initial force and to the maximum force exerted by an oscillating device on the compound test-piece heated to a given temperature.

The progression of the vulcanization curve initially exhibits a depression (saddle region) where there is the minimum force, corresponding in the raw condition to the plastic state ($M_L$) and then the curve gradually rises up to a constant maximum value ($M_H$) corresponding to the vulcanization level where the instrument exerts the maximum force.

The characteristics indicated in Table 1 by the symbols $t_{30}$, $t_{60}$ are expressed in seconds and each indicates the time required to reach the percentage (30% and 60%) of the difference between the maximum force and the minimum force.

Table 2 below indicates the characteristics of a test piece consisting of the compound extracted from the second mixer after vulcanization for 30' (minutes) at the temperature of 151° C.

TABLE 2

| Characteristic | | Mean value | Variability |
|---|---|---|---|
| Density | (g/cm$^3$) | 1.196 | ±0.004 |
| 100% modulus (CA1) | MPa) | 2.3 | ±0.2 |
| 300% modulus (CA3) | (MPa) | 9.8 | ±0.6 |
| Ultimate tensile strength | (MPa) | >15.0 | |
| Ultimate elongation | (%) | >400 | |
| Hardness | (IRHD) | 73 | ±2 |

The density is measured by using the procedure defined in the standard ISO 2781.

The dynamometric characteristics are expressed by the moduli measured along the force/deformation curve traced in a Cartesian diagram having in its ordinate axis the forces expressed in MPa and in its abscissa axis the deformations.

The testing procedures are defined in the standard ISO 37 and the symbols CA1 and CA3 shown in Table 2 indicate the value of the load measured at 100% and 300% deformation of the test piece, respectively.

Using a methodology similar to that explained hitherto for the mixing step, in the method according to the invention reference values with the associated deviations are determined also for the other critical steps in processing of the mixtures.

Thus, for example, the stay (maintenance) times inside the extruder for step 3 downstream from the closed mixer 10 are determined, together with any other operation in successive mixers and the like, depending on the used operating cycle.

On the basis of the data and the information obtained above, a coefficient indicating the weight which non-compliance of a given parameter with the predefined tolerances assumes in the production of a compound or a final mixture with the desired characteristics, is assigned.

This situation is illustrated in the tables shown in FIGS. 4, 5.

As illustrated, FIG. 4 shows a table divided into a number of sections, the first one of which (on the left) contains the process parameters considered for processing of a given mixture in the discontinuous mixer 10.

The second section (alongside the first one) shows the nominal values of the aforementioned process parameters, and their variation tolerances with respect to the nominal values and the coefficients (or weights) attributed in the event of non-compliance with the tolerances.

These values relate to the operating steps for processing in the mixer 10, which are illustrated in the graph of FIG. 3 and are indicated in the first column by the same letters.

The third section (on the right of the preceding one) in FIG. 4, on the other hand, shows the values of the process parameters actually measured during the course of processing of a mixture with the abovementioned recipe, together with the weights attributed depending on whether the predefined tolerances are respected (or not).

The weight which non-compliance with the various tolerances assumes with regard to achieving a desired mixture will obviously depend on each individual case; in Table 4, a scale of values ranging from a minimum of 0 to a maximum of 40 has been chosen.

The weight factors attributed are then added together so as to provide an overall end result which, compared with the reference classification shown in the last right-hand section of FIG. 4, provides the evaluation of the mixture.

Therefore, in this way it is possible to establish immediately, at the outlet from the mixer 10, whether a batch of material has been processed in accordance with the desired requirements.

In the case of FIG. 4 it can be seen that the total score, i.e. that resulting from the sum of the individual weight factors attributed during the various process operating steps in the mixer 10, has a value of 45 and, from a comparison with the reference classification, it can be deduced that the processed mixture falls within the third of the four categories envisaged, i.e. the category representing the $2^{nd}$ degree of non-compliance.

A similar methodology is adopted for the other mixture processing steps.

For example, FIG. 5 shows a table which relates to the extrusion of the mixture; since this step (indicated by 3 in FIG. 1) is simpler than the preceeding mixing operation, the associated table is also simplified.

In this case, the process parameter to be complied with is the stay time inside the extruder; in the same way as before, therefore a reference classification for this parameter is established, said classification acting as a means of comparison for the actual value measured, in order to determine the quality of the mixture at the outlet.

As shown, in FIG. 5 only three classification categories (instead of four as in the previous case) have been defined for this parameter; once the extrusion phase 3 has been completed, the sheets leaving the calender undergo the remaining working steps illustrated in FIG. 1.

This is performed continuously (i.e. without interruption) and controlled depending on the progress of production.

Indeed, as illustrated above, with the method according to the invention it is possible to obtain an evaluation, in real time, as to the quality of the semi-finished products obtained from a given batch of starting materials; on the basis of this evaluation it is therefore possible to establish immediately, along the production line, i.e. without having to perform separate laboratory tests on samples taken from the production line, the subsequent use of the semi-finished product.

As a result it is possible to achieve a nearly continuous working cycle, controlling the production with a normal automated system (i.e., a PLC or similar) which functions in accordance with the logic described above; in particular, it will no longer be necessary to interrupt the process to wait for the outcome of the laboratory tests.

For this purpose it is sufficient to provide, at the extrusion outlet, means (such as a punch or the like) for marking the sheets obtained from a given initial batch; in this way any sheet classified as defective or to be discarded (owing to human error or malfunctioning in the mixing or extrusion apparata) may be distinguished from the preceeding or following ones.

Subsequently, along the production line, said sheet will then be separated by means of a cutting operation and will be arranged on a bench together with the sheets which have been attributed the same evaluation.

It should be noted that, in so doing, it is avoided to mix together sheets obtained from batches defect-free and sheets obtained from batches which are defective or which have to be discarded, with the consequent risk of contaminating the semi-finished products that are in a good state and of discarding them as well.

Indeed, in the known art, for monitoring the production laboratory tests are carried out not only on the intermediate mixtures, but also on the (both raw and vulcanized) compound obtained therewith; consequently, if one (or more) of these mixtures (which should be discarded) is mixed with other defect-free mixtures in order to obtain the compound, also the obtained end product has to be discarded, with the corresponding economic loss arising therefrom.

Figure 6:
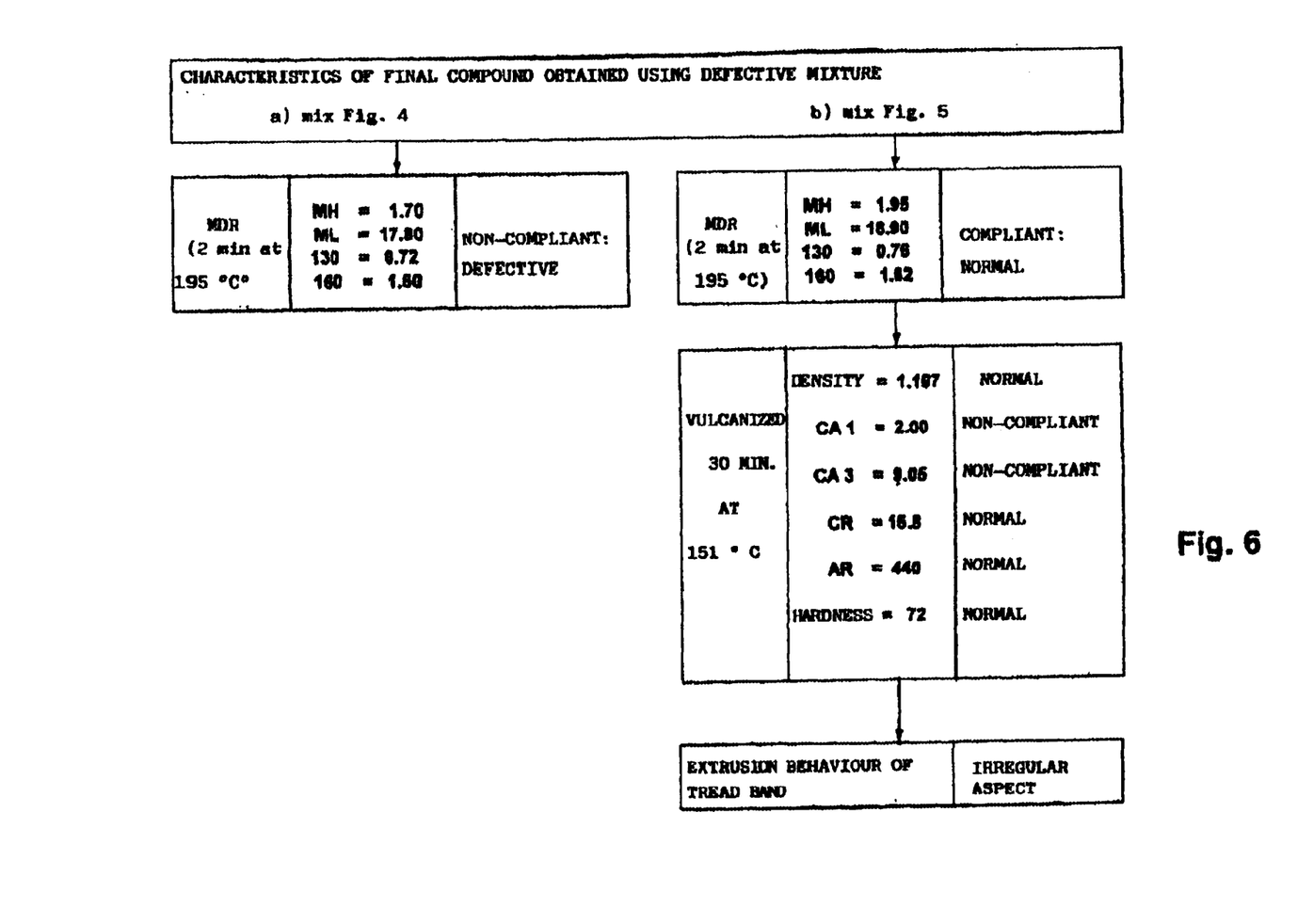
FIG. 6 shows a further table relating to the characteristics of two compounds produced using the method according to the invention.

For the sake of completeness of explanation, FIG. 6 shows in the form of a table the characteristics of the raw compounds obtained by using mixtures considered defective and to be discarded in FIGS. 4 and 5, respectively: i.e., a mixture for which mixing was not performed in compliance with the predefined conditions and a mixture which remained in the extruder for too long.

In this latter case, the characteristics of the vulcanized compound (30 minutes at 151° C.) and the behaviour of the tread band during extrusion have also been taken into consideration; the symbols used are the same as those used in the preceeding Tables 1 and 2.

Of course, variations of the invention with respect to that described hitherto are possible.

Firstly it can be pointed out that said invention is not limited only to processing cycles such as that shown in FIG. 1; the latter is in fact a simple cycle during which silicization and silanization of the mixture are performed in the same mixer, but there is nothing to prevent these two steps from being performed in respective mixers, with the mixture being discharged from one mixer and introduced into the other one.

It should also be pointed out that the method according to the invention may also be applied to the processing of compounds, namely to the product obtained by adding the vulcanization components to a mixture.

In other words, the system of determining nominal reference values with the associated tolerances for the process parameters and then evaluating the degree of compliance with said values during production, so as to control the progression thereof, may be applied both to mixtures in general and to the products obtained therefrom, such as for example the compounds.

These and other possible variants in any case fall within the scope of the claims which follow.

What is claimed is:

1. Method for processing a rubber mixture or a compound for the manufacturing of tires, said processing comprising at least a mixing cycle and an extrusion cycle for obtaining a semi-finished product and wherein said cycles are controlled by process parameters detected during execution thereof, characterized in that it comprises the steps of:

a) determining variation tolerances with respect to reference values for the process parameters;

b) comparing the detected values of the process parameters with the reference values;

c) attributing an evaluation to the semi-finished product depending on the compliance or non-compliance of the values detected with the predefined tolerances;

d) classifying the semi-finished product on the basis of the evaluation attributed;

e) establishing the successive steps for processing of the semi-finished product depending on classification thereof.

2. A method for processing a rubber mixture or compound for tyre manufacturing, comprising the steps of:

a) determining variation tolerances with respect to reference values for process parameters;

b) detecting values of the process parameters;

c) comparing the detected values of the process parameters with the reference values and the variation tolerances;

d) attributing an evaluation to a semi-finished product depending on compliance or noncompliance of the detected values with the reference values and the variation tolerances;

e) classifying the semi-finished product on a basis of the attributed evaluation; and f) establishing successive steps for processing the semi-finished product depending on the classification of the semi-finished product;

wherein the processing comprises at least a mixing cycle and an extrusion cycle for obtaining the semi-finished product, and wherein the cycles are controlled by the process parameters detected during execution of the cycles.

3. The method of claim 2, wherein steps b) through f) are performed in an automated manner.

4. The method of claim 2, wherein the process parameters detected comprise one or more of:

duration of at least part of the mixing cycle;

temperature and energy absorbed by the rubber mixture or compound during at least part of the mixing cycle; and duration of an extrusion cycle.

5. The method of claim 4, wherein the mixing cycle is performed with at least one mixer comprising a pair of rotors, and wherein the pair of rotors operate tangentially relative to each other or are inter-penetrating.

6. The method of claim 5, wherein coefficients, indicating the compliance or noncompliance of the detected values with the reference values and the variation tolerances, are attributed to the process parameters detected during the mixing cycle, and wherein the evaluation of the semi-finished product is performed by adding together the coefficients attributed and comparing a sum of the coefficients attributed with a reference classification.

7. The method of claim 6, wherein the extrusion cycle is performed using at least one single-screw or double-screw extruder associated with a pair of calendering rolls.

8. The method of claim 7, wherein the calendering rolls are of a friction type, a variable-speed type, or a friction and variable-speed type.

9. The method of claim 6, wherein the extrusion cycle is performed using at least one single-screw or double-screw extruder and at least one mixer of an open type.

10. The method of claim 4, wherein a stay time in an extruder is detected for the extrusion cycle, and wherein the evaluation of the semi-finished product is performed by comparing the detected stay time with a reference classification.

11. The method of claim 10, wherein the semi-finished product is marked downstream from the extrusion cycle to enable identification and separation of the semi-finished product from other semi-finished products obtained prior to, subsequent to, or prior to and subsequent to the semi-finished product.

12. The method of claim 11, wherein the processed rubber mixture or compound comprises silica as a reinforcing element.

13. The method of claim 12, wherein ingredients of the compound, per hundred parts-by-weight of polymeric base (phr), comprise:

| | |
|---|---|
| Polymeric base | 100 phr; |
| Carbon black | 0–80 phr; |
| Silica | 10–80 phr; |
| Bonding agent | 4%–15% of the silica; |
| Zinc oxide (ZnO) | 1–3 phr; |
| Stearic acid | 0–3 phr; |
| Anti–degradation agents | 1–3 phr; |
| Plasticizing oil | 0–30 phr; |
| Anti–ozone wax | 0.5–3 phr; and |
| Specific chemical ingredients | 0–15 phr; |

14. The method of claim 13, wherein characteristics of the compound, when vulcanized for 30 minutes at 151° C., comprise:

| Characteristic | | Mean value | Variability |
|---|---|---|---|
| Density | (g/cm$^3$) | 1.196 | ±0.004; |
| 100% modulus (CA1) | (MPa) | 2.3 | ±0.2; |
| 300% modulus (CA3) | (MPa) | 9.8 | ±0.6; |
| Ultimate tensile strength | (MPa) | >15.0; | |
| Ultimate elongation | (%) | >400; and | |
| Hardness | (IRHD) | 73 | ±2; | wherein IRHD stands for International Rubber Hardness Degrees.

* * * * *